FAULTY COMPONENT PROTECTION SYSTEM

Filed Jan. 26, 1968

INVENTORS
DONG W. RHEE
ROBERT C. WHEELER
BY Cyril A. Krenzer
ATTORNEY

FAULTY COMPONENT PROTECTION SYSTEM

Filed Jan. 26, 1968

INVENTORS
DONG W. RHEE
ROBERT C. WHEELER
BY
Cyril A. Krenzer
ATTORNEY

United States Patent Office 3,440,481

Patented Apr. 22, 1969

3,440,481
FAULTY COMPONENT PROTECTION SYSTEM

Dong W. Rhee, Williamsville, and Robert Charles Wheeler, Batavia, N.Y., assignors to Sylvania Electric Products Inc., a corporation of Delaware Filed Jan. 26, 1968, Ser. No. 700,759
Int. Cl. H01j 29/70
U.S. Cl. 315—22 10 Claims

ABSTRACT OF THE DISCLOSURE

In a cathode ray tube high voltage system having a signal amplifier means coupled to a cathode ray tube and a current generator means coupled by a high voltage rectifier means to the cathode ray tube, a faulty component protection system including a shunt regulating means having a shunt regulator tube and a unidirectional conduction device series coupled intermediate the high voltage rectifier means and a voltage reference source and a current generator bias means including a D.C. potential source coupling the shunt regulating means to the current generator means whereby failure of the shunt regulator tube tends to cause an undesired increase in potential available from the high voltage rectifier means which is opposed by application of an increased bias potential to the current generator means. Also, failure of the shunt regulator tube causes disablement of the cathode ray tube by way of a signal amplifier bias means coupled intermediate the current generator means and the signal amplifier means.

*Background of the invention*

Cathode ray tube high voltage systems usually include a cathode ray tube having a beam intensity control electrode and a high voltage electrode, means for generating a current, and high voltage rectifier means coupled and responsive to the current generating means for providing a rectified high voltage which is applied to the high voltage electrode of the cathode ray tube. Also, a signal amplification means is usually coupled to and controls the intensity of the beam intensity control electrode of the cathode ray tube.

Further, such high voltage systems are commonly employed in relatively sophisticated apparatus such as color television receivers wherein regulation of the high voltage potential is essential. In such apparatus, it is a common practice to include a shunt regulator tube intermediate the high voltage source and a reference voltage source. In this manner, any tendency toward undesired increased high voltage applied to the cathode ray tube is, in effect, opposed by the shunting action of the shunt regulator tube. Thus, the shunt regulator tube tends to maintain a substantially constant level of high voltage potential.

Although such systems have provided excellent performance and received wide-spread acceptance for years, it has recently been discovered that such systems do leave something to be desired. More specifically, it has been found that failure of certain components of the system, notably the shunt regulator tube, tends to cause an undesired relatively extreme increase in the potential developed by the high voltage system which is deleterious to the system. Moreover, this undesired component failure is not readily discernible to the average viewer of a television receiver. Thus, the television receiver undesirably continues to be operated under adverse operational conditions.

*Objects and summary of the invention*

Therefore, it is an object of the present invention to provide an enhanced faulty component protection system for a cathode ray tube high voltage system. Another object of the invention is to prevent an increased level of high voltage potential in a cathode ray tube high voltage system in the event of component failure in the high voltage system. Still another object of the invention is to provide an improved faulty component protection system which not only prevents development of an increased level of high voltage potential but also disables the cathode ray tube high voltage system in the event of component failure.

These and other objects and advantages are achieved in one aspect of the invention by a faulty component protection system wherein is included a shunt regulating means having a shunt regulator tube and a unidirectional conduction device series coupled intermediate a high voltage rectifier means and a reference voltage source and a current generator bias means including a voltage source coupling the shunt regulating means to a current generator means wherefrom the high voltage is developed by a high voltage rectifier means. Thus, failure of the shunt regulator tube causes the unidirectional conduction device to, in effect, disconnect the reference voltage source whereupon the bias applied to the current generator means is increased and the potential derived from the high voltage rectifier means reduced.

Also, a signal amplifier bias means is coupled intermediate a signal amplifier means, connected to the beam intensity electrode of the cathode ray tube, and the current generator means. Again, failure of the shunt regulator tube causes an increase in bias potential applied to the current generator means and, via the signal amplifier bias means, to the signal amplifier means and to the beam intensity electrode of the cathode ray tube which, in turn, disables the cathode ray tube notifying the viewer of a component failure.

*Description of the preferred embodiments*

For a better understanding of the present invention, together with other and further objects, advantages and capabilities thereof, reference to the accompanying drawings and appended claims should be made in conjunction with the following disclosure. Also, the disclosure will be discussed in the environment of a color television receiver for purposes of simplification and clarity.

Figure 1:
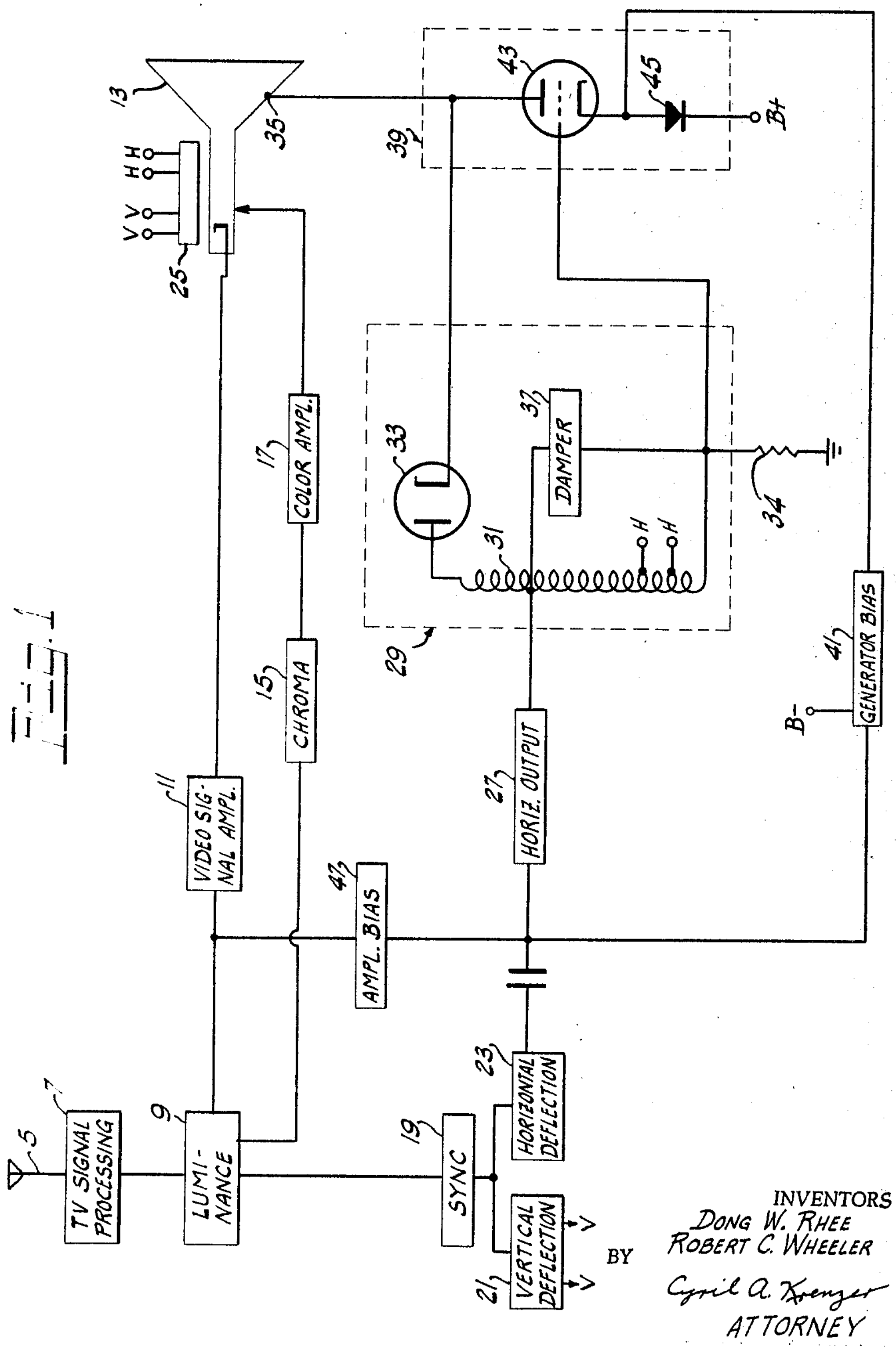
FIG. 1 is a partial block and schematic diagram of a color television receiver employing one embodiment of the faulty component protection system of the invention.

Referring to the drawings, FIG. 1 illustrates a partial block and schematic diagram of a color television receiver. The receiver includes an antenna 5 coupled to a TV signal processing portion 7, including the usual radio frequency (RF) and intermediate frequency (IF) amplification and detection stages, for providing a composite color signal. This composite color signal is applied to a luminance channel 9 having the normal amplication stages and delay line and wherefrom a luminance signal representative of brightness of a viewed image is applied to a video signal output stage 11 and to the cathode or beam intensity control electrode of a color cathode ray tube 13.

Also, a signal from the luminance channel 9 is applied to a chrominance channel 15 wherein the chrominance signal is separated from the composite color signal and wherefrom this chrominance signal is applied via a color amplifier portion 17 to the control electrodes of the color cathode ray tube 13. The composite color signal from the luminance channel 9 is also coupled to a sync separator stage 19 wherein the synchronizing pulse signals are separated from the composite color signal.

These synchronizing pulse signals are applied to and control the operation of the vertical deflection circuitry 21 and horizontal deflection circuitry 23. The vertical deflection circuitry 21 has output terminals VV wherefrom vertical deflection signals are applied to terminals VV of a deflection yoke 25 associated with the color cathode ray tube 13.

Also, a signal from the horizontal deflection circuitry 23 is applied to a current generating means in the form of a horizontal output stage 27. The current generating means or horizontal output stage 27 is coupled to a high voltage rectifier means 29, including a pulse type auto-transformer winding 31 having one terminal connected to a rectifier device 33 and the other terminal coupled via a resistor 34 to a voltage reference level such as circuit ground. A damper stage 37 shunts a portion of the winding 31 and a pair of output terminals HH of the winding 31 are coupled to terminals HH of the deflection yoke 25 in a manner well-known in the art.

The rectifier device 33 is coupled to the high voltage electrode 35 of the color cathode ray tube 13 and to a faulty component protection system having a shunt regulating means 39 and a current generator bias means 41 including a D.C. potential source B−. The shunt regulating means 39 includes a shunt regulating tube 43 and a unidirectional conductive device 45 series connected intermediate the rectifier device 33 and a reference voltage source B+. Also, the current generator bias means 45 including the D.C. potential source B− is coupled intermediate the shunt regulating means 39 and the current generating means or horizontal output stage 27. Further, a signal amplifier bias means 47 couples the junction of the current generator bias means 41 and horizontal output stage 27 to the video signal output stage 11.

Figure 2:
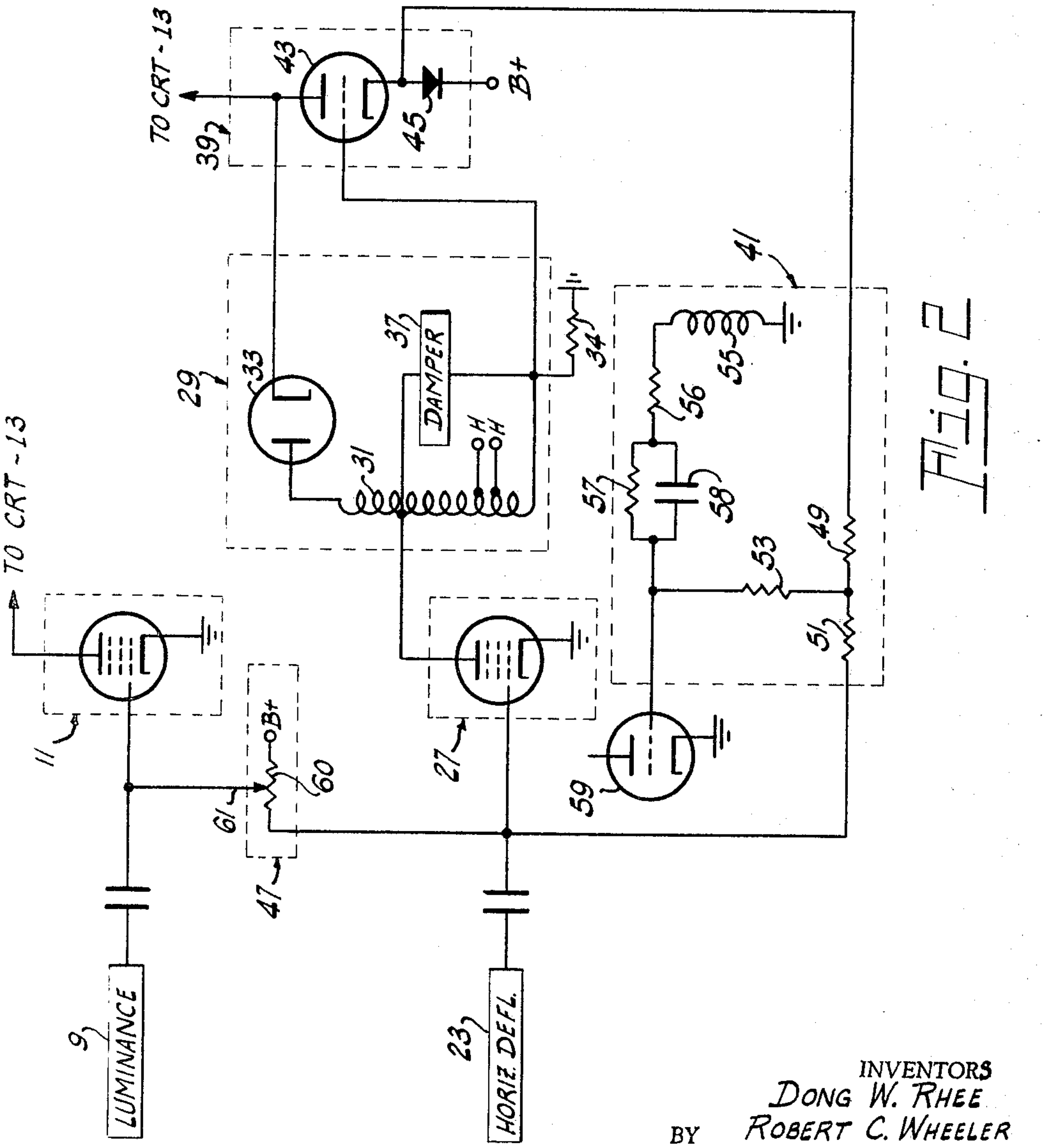
FIG. 2 is a schematic diagram illustrating the embodiment of FIG. 1.

Referring to the more detailed illustration of FIG. 2, the shunt regulating means 39 of the faulty component protection system includes a shunt regulator tube 43 having an output electrode, a control electrode, and a cathode electrode. The output electrode of the shunt regulator tube 43 is coupled to the junction of the high voltage rectifier means 29 and the high voltage electrode 35 of the color cathode ray tube 13. The control electrode is coupled to the junction of the high voltage rectifier means 29 and the resistor 34 while the cathode electrode is coupled to the unidirectional conduction device 45 connected to the reference voltage source B+ and to the current generator bias means 41.

The current generator bias means 41, in this particular embodiment, includes a pair of resistors 49 and 51 respectively, series connecting the shunt regulating means 39 to the current generator means or horizontal output stage 27. The junction of the series connected resistors 49 and 51 is coupled via a resistor 53 to a D.C. potential source B−. In this particular illustration the D.C. potential source B− is in the form of an auxiliary winding 55 connected intermediate circuit ground and by way of a series connected resistor 56 and parallel coupled resistor 57 and capacitor 58 to the grid electrode of an electron discharge device 59 which may, for instance, be in the burst gate or blanker stages common to most color television receivers. Obviously, the D.C. potential source B− is not to be construed as restricted to this particular illustration.

Also, the signal amplifier bias means 47 is in the form of an adjustable resistor 60 having an alterable arm 61. The adjustable resistor 60 is coupled intermediate the junction of the current generating means or horizontal output stage 27 and the current generator bias means 41 and a voltage source B+. This adjustable resistor 60 which is frequently the brightness control adjustment of a television receiver includes the above-mentioned alterable arm 61 which is coupled to the video signal output stage

11 whereby the magnitude of the luminance signal available from the video signal output stage 11 and applied to the color cathode ray tube 13 is controlled.

As to the operation, the horizontal output stage or current generator means 27 provides a rapidly changing or sawtooth-shaped waveform of current in response to a signal applied thereto from the horizontal deflection circuitry 23. This rapidly changing sawtooth-shaped waveform of current is applied to the high voltage rectifier means 29 wherein is developed a relatively high A.C. potential which is rectified to provide a relatively high D.C. potential for application to the high voltage electrode 35 of the color cathode ray tube 13. Also, the high voltage rectifier means 29 provides a boosted B+ voltage which appears at the junction of the winding 31 and the resistor 34.

Normally, the shunt regulating means 39 of the faulty component protection system functions to maintain a substantially constant level of high voltage potential which is applied to the high voltage electrode 35 of the color cathode ray tube 13. In other words, current flow through the shunt regulating means 39 tends to decrease as the high voltage potential decreases which, in turn, tends to cause the return of the high voltage potential to the desired level. More specifically, an increase in beam current of the color cathode ray tube 13 tends to cause a decrease in the potential level of the high voltage because of the additional load thereon. In turn, the boost voltage applied to the control electrode of the shunt regulator tube 43 tends to decrease whereby the potential difference or bias potential between the reference voltage source B+ and boost voltage is increased. As a result, current conduction through the shunt regulator tube decreases and the potential applied to the high voltage electrode 35 of the cathode ray tube 13 is returned to the desired level.

However, in the event of failure of the shunt regulator tube 43, current flow through the unidirectional conduction device 45 will tend to reverse direction due to the negative D.C. potential provided by the potential source B− of the current generator bias means 41 whereupon the unidirectional conduction device 45 becomes, in essence, an open circuit disconnecting the reference voltage source B+. Thus, a maximum magnitude of the D.C. potential source B− available at the junction of the series connected resistors 49 and 51 is applied to the current generating means or horizontal output stage 27 whereby the power generated and the level of the high voltage potential is greatly reduced.

Also, the increased negative D.C. potential available at the horizontal output stage 27 due to the disconnection of the reference voltage source B+ by the unidirectional conduction device 45 is applied to the adjustable resistor 60 of the signal bias amplifier means 47 and via the alterable arm 61 to the signal amplifier stage 11. Thus, the bias applied to the signal amplifier stage 11 is increased causing an increase in the bias potential applied to the beam intensity electrode of the color cathode ray tube 13 and a reduction in the intensity of the electron beam. Moreover, the intensity of the electron beam is preferably reduced to a point whereat the color cathode ray tube 13 is disabled.

Figure 3:
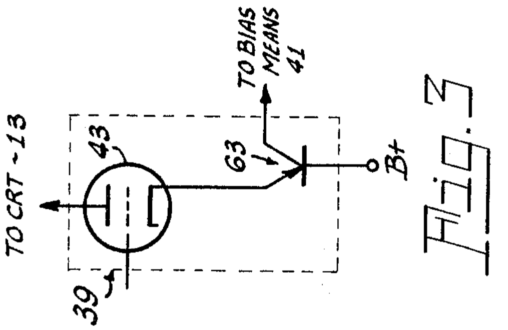
FIG. 3 is a schematic diagram illustrating an alternate embodiment of the faulty component protection system of FIG. 1.

Additionally, an alternative unidirectional conduction device for the shunt regulating means 39 is illustrated in FIG. 3. Herein, an electron device 63, preferably a PNP transistor, includes an emitter electrode coupled to the shunt regulator tube 43, a base electrode coupled to the reference voltage source B+, and a collector electrode coupled to the current generator bias means 41.

Essentially, the embodiment of FIG. 3 operates in a manner similar to the embodiment of FIG. 2. That is, failure of the shunt regulator tube 43 causes the appearance of an increased bias potential at the electron device 63 which essentially "open circuits" the reference voltage source B+. Thus, the increased level of the potential available from the potential source B− is applied to the horizontal output stage 27 reducing the current generated thereby and, in turn, the high voltage developed by the high voltage rectifier means 29. Moreover, the increased level of potential available from the potential source B— is applied via the signal amplifier bias means 47 to the signal amplifier stage 11. Thereupon, an increased bias potential is applied to the cathode ray tube 13 reducing the intensity of the electron beam and disabling the color cathode ray tube 13.

Thus, there has been provided a unique faulty component protection system for high voltage systems which not only prohibits the development of undesired high voltages in the event of component failure but also reduces power dissipation in the current generating means or horizontal output stage and the entire high voltage system. Further, means are provided for rendering the entire apparatus inoperative in the event of such component failure, thereby protecting the apparatus from numerous forms of damage and failures caused by continued operation without proper replacement of the faulty component. Moreover, the consumer or viewer is automatically made aware of a component failure.

We claim:

1. In a cathode ray tube high voltage system having a cathode ray tube with a beam intensity control electrode and a high voltage electrode, signal amplifier means coupled to the beam intensity control electrode, current generation means, and high voltage rectifier means coupling the current generating means to the high voltage electrode of the cathode ray tube, a faulty component protection system comprising in combination:

shunt regulating means including a shunt regulator tube and unidirectional conduction device, said shunt regulator tube coupling said high voltage rectifier means to a reference voltage source via said unidirectional conduction device; and current generator bias means including a D.C. potential source coupling said shunt regulating means to said current generating means whereby failure of said shunt regulator tube tending to increase the potential available from said high voltage rectifier means causes application of increased bias potential to said current generator means preventing an undesired increase in potential available from said high voltage rectifier means.

2. The faulty component protection system of claim 1 wherein said unidirectional conduction device is in the form of a diode having an anode connected to the shunt regulator tube and a cathode connected to the reference voltage source.

3. The faulty component protection system of claim 1 wherein said unidirectional conduction device is in the form of a transistor having an emitter coupled to the shunt regulator tube, a base coupled to the reference voltage source, and a collector coupled to said current generator bias means.

4. The faulty component protection system of claim 1 wherein said current generator bias means is in the form of a pair of series connected resistors coupling the shunt regulator means to the current generating means and having a junction connected to a negative D.C. potential source.

5. The faulty component protection system of claim 1 including a signal amplifier bias means coupled intermediate said current generator means and said signal amplifier means.

6. The faulty component protection system of claim 5 wherein said signal amplifier bias means is in the form of an adjustable resistor having an alterable arm and a D.C. potential source, said adjustable resistor interconnecting said D.C. potential source and current generator means with said alterable arm coupled to said signal amplifier means.

7. In a television receiver having a high voltage system including a cathode ray tube with a beam intensity control electrode and a high voltage electrode, a video signal amplification stage coupled to the beam intensity control electrode, a horizontal amplifier stage for generating current in response to flyback voltage pulses, and high voltage rectifier means coupling the horizontal amplifier stage to the high voltage electrode of the cathode ray tube, a faulty component protection circuit comprising in combination:

shunt regulating means including a shunt regulator tube and unidirectional conduction device series connected intermediate the high voltage rectifier means and a reference voltage source; and horizontal amplifier bias means including a D.C. potential coupling said shunt regulating means to said horizontal amplifier stage whereby failure of said shunt regulator tube, in effect, causes said unidirectional conduction device to electrically disconnect said reference voltage source which increases the bias potential applied to said horizontal amplifier stage reducing the high voltage developed by said high voltage rectifier means.

8. The faulty component protection circuit of claim 7 wherein said unidirectional conduction device is in the form of a diode having an anode connected to a shunt regulator tube and a cathode connected to said reference voltage source, said reference voltage source being in the form of a positive D.C. potential source.

9. The faulty component protection circuit of claim 7 wherein said unidirectional conduction device is in the form of a transistor having an emitter coupled to said shunt regulator tube, a base coupled to said reference voltage source, and a collector coupled to said horizontal amplifier bias means.

10. The faulty component protection circuit of claim 7 including a video signal amplification stage bias means coupling said horizontal amplifier stage to said video signal amplification stage, said bias means including an adjustable resistor having an alterable arm and a positive D.C. potential source.

References Cited

UNITED STATES PATENTS

| | | | |
|---|---|---|---|
| 2,854,592 | 9/1958 | Ruth. | |
| 3,375,436 | 3/1968 | Denton | 315—22 X |

RICHARD A. FARLEY, *Primary Examiner.*

T. H. TUBBESING, *Assistant Examiner.*